United States Patent
Iwamura et al.

(10) Patent No.: US 10,189,311 B2
(45) Date of Patent: Jan. 29, 2019

(54) AIRLESS TIRE

(71) Applicant: SUMITOMO RUBBER INDUSTRIES, LTD., Kobe (JP)

(72) Inventors: Wako Iwamura, Kobe (JP); Makoto Sugiya, Kobe (JP); Naoki Shirakawa, Imizu (JP); Hitoshi Takeuchi, Imizu (JP); Shoushuu Yamazaki, Imizu (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 98 days.

(21) Appl. No.: 15/333,772

(22) Filed: Oct. 25, 2016

(65) Prior Publication Data

US 2017/0113489 A1    Apr. 27, 2017

(30) Foreign Application Priority Data

Oct. 26, 2015  (JP) .................................. 2015-209667

(51) Int. Cl.
  *B60C 7/10*    (2006.01)
  *B60B 5/02*    (2006.01)
  (Continued)

(52) U.S. Cl.
  CPC ............... *B60C 7/102* (2013.01); *B60B 5/02* (2013.01); *B60B 11/06* (2013.01); *B60C 7/14* (2013.01);
  (Continued)

(58) Field of Classification Search
  CPC .. B60C 7/102; B60C 7/18; B60C 7/14; B60B 11/06; B60B 5/02; B60B 2360/50; B60B 2310/04
  (Continued)

(56) References Cited

U.S. PATENT DOCUMENTS 1,641,663 A    9/1927  Dalton
1,791,128 A    2/1931  Hatfield
(Continued)

FOREIGN PATENT DOCUMENTS

EP    2 801 485 A1    11/2014
JP    5432837 B    12/2013
(Continued)

OTHER PUBLICATIONS

Extended European Search Report dated Mar. 2, 2017 in Patent Application No. 16194701.5.

*Primary Examiner* — S. Joseph Morano
*Assistant Examiner* — Jean W Charleston
(74) *Attorney, Agent, or Firm* — Oblon, McClelland, Maier & Neustadt, L.L.P.

(57) ABSTRACT

An airless tire includes multiple tire pieces including a first tire piece and a second tire piece such that the first and second tire pieces are integrated in alignment in tire axial direction. The first tire piece includes a first tread ring, a first inner periphery portion and first spokes such that the first ring has a cylindrical form and a ground contact surface, the first periphery portion is formed on radial direction inner side of the first ring, and the first spokes are connecting the first ring and periphery portion, and the second tire piece includes a second tread ring, a second inner periphery portion, and second spokes such that the second ring has a cylindrical form and a ground contact surface, the second periphery portion is formed on radial direction inner side of the second ring, and the second spokes are connecting the second ring and periphery portion.

20 Claims, 7 Drawing Sheets

(51) Int. Cl.
  *B60C 7/14*   (2006.01)
  *B60B 11/06*  (2006.01)
  *B60C 7/18*   (2006.01)
(52) U.S. Cl.
  CPC .......... *B60C 7/18* (2013.01); *B60B 2310/204* (2013.01); *B60B 2360/50* (2013.01); *B60C 2007/146* (2013.01)
(58) Field of Classification Search
  USPC ....... 152/246, 300, 301, 302, 303, 323, 325, 152/327, 328, 329
  See application file for complete search history.

(56) References Cited

U.S. PATENT DOCUMENTS

| | | | | |
|---|---|---|---|---|
| 3,957,101 A | * | 5/1976 | Ippen | B29D 30/02 152/301 |
| 4,037,635 A | * | 7/1977 | Ippen | B29D 30/02 152/301 |
| 5,460,213 A | | 10/1995 | Pajtas | |
| 5,676,900 A | | 10/1997 | Pajtas | |
| 8,851,131 B2 | * | 10/2014 | Luchini | B60C 7/10 152/246 |
| 2009/0211677 A1 | | 8/2009 | Palinkas et al. | |
| 2013/0167990 A1 | | 7/2013 | Bae | |
| 2014/0062169 A1 | | 3/2014 | Martin et al. | |
| 2014/0332127 A1 | | 11/2014 | Iwamura | |
| 2017/0232787 A1 | * | 8/2017 | Hasegawa | B60B 9/04 301/35.1 |

FOREIGN PATENT DOCUMENTS

| | | |
|---|---|---|
| WO | WO 95/14582 A1 | 6/1995 |
| WO | WO 2007/057975 A1 | 5/2007 |
| WO | WO 2008/050503 A1 | 5/2008 |

\* cited by examiner

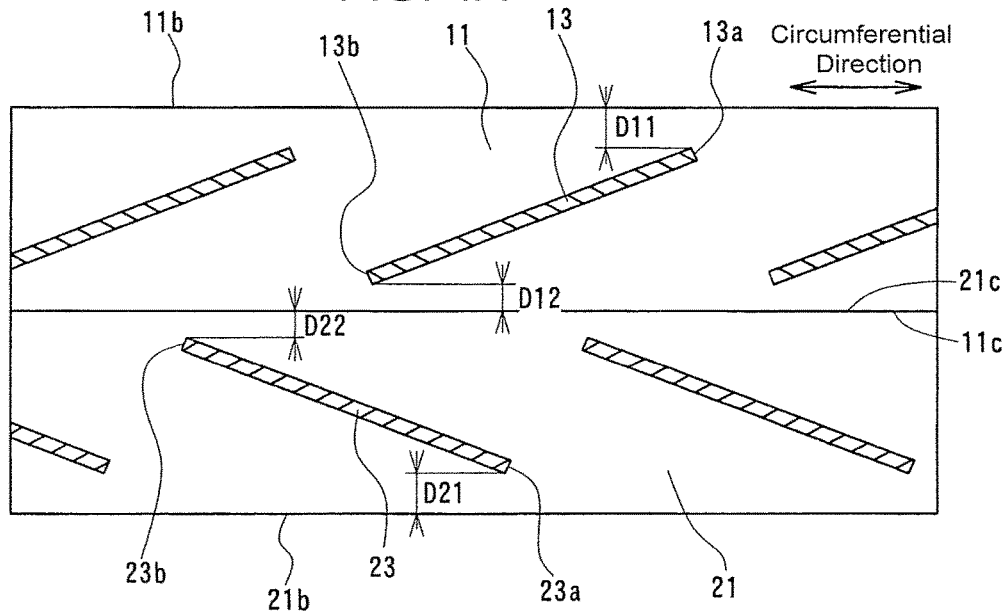
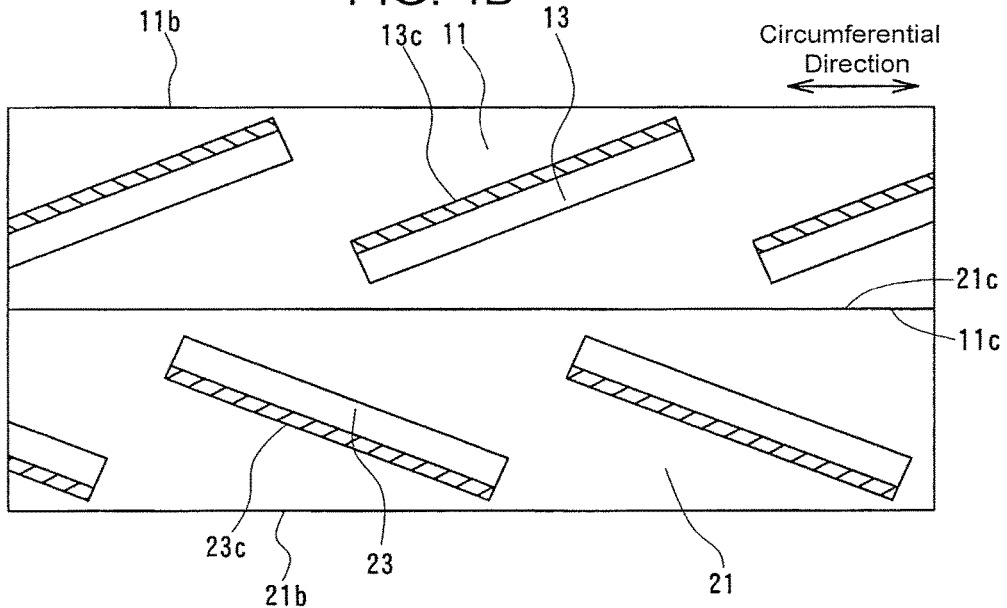

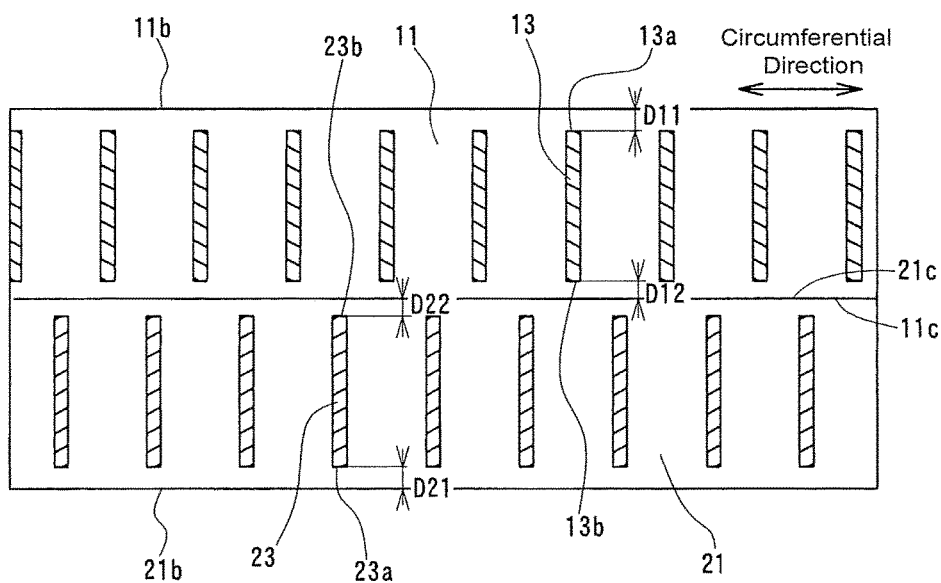
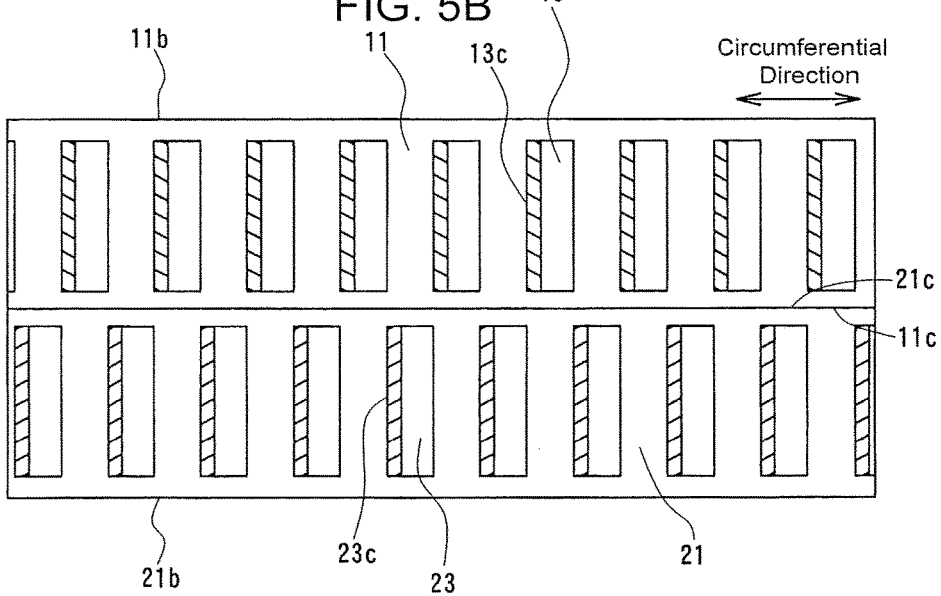

AIRLESS TIRE

CROSS-REFERENCE TO RELATED APPLICATIONS

The present application is based upon and claims the benefit of priority to Japanese Patent Application No. 2015-209667, filed Oct. 26, 2015, the entire contents of which are incorporated herein by reference.

BACKGROUND OF THE INVENTION

Field of the Invention
The present invention relates to an airless tire that is excellent in uniformity performance and design performance.

Description of Background Art
An airless tire may have a structure in which a cylindrical tread ring and an inner periphery part are connected by multiple spokes, the tread ring having a ground contact surface, the inner periphery part being fixed to an axle, and the spokes being radially arranged (for example, see Japanese Patent No. 5432837). Further, various studies have been conducted (for example, see International Publication No. 2008/050503). The entire contents of these publications are incorporated herein by reference.

SUMMARY OF THE INVENTION

According to one aspect of the present invention, an airless tire includes multiple tire pieces including a first tire piece and a second tire piece such that the first tire piece and the second tire piece are integrated in alignment in a tire axial direction. The first tire piece includes a first tread ring, a first inner periphery portion and first spokes such that the first tread ring has a cylindrical form and a ground contact surface, the first inner periphery portion is formed on a radial direction inner side of the first tread ring, and the first spokes are connecting the first tread ring and the first inner periphery portion, and the second tire piece includes a second tread ring, a second inner periphery portion, and second spokes such that the second tread ring has a cylindrical form and a ground contact surface, the second inner periphery portion is formed on a radial direction inner side of the second tread ring, and the second spokes are connecting the second tread ring and the second inner periphery portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A and 4B are developed views when first spokes and second spokes are viewed from a tire axis side;

FIGS. 5A and 5B are developed views when first spokes and second spokes of a modified embodiment of FIGS. 4A and 4B are viewed from a tire axis side;

DETAILED DESCRIPTION OF THE EMBODIMENTS

Figure 1:
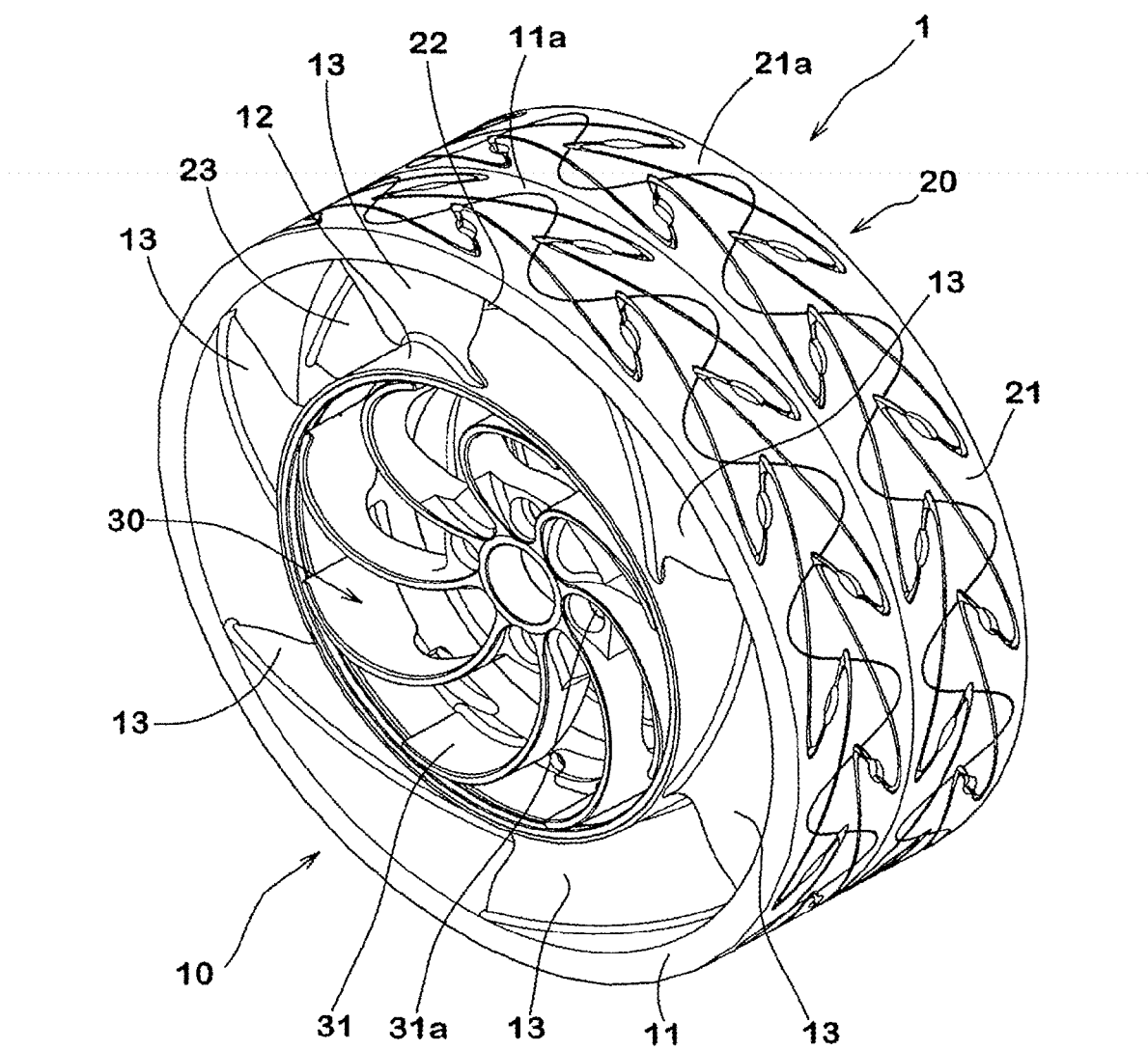
FIG. 1 is a perspective view illustrating an airless tire according to an embodiment of the present invention.

The embodiments will now be described with reference to the accompanying drawings, wherein like reference numerals designate corresponding or identical elements throughout the various drawings.

Figure 2:
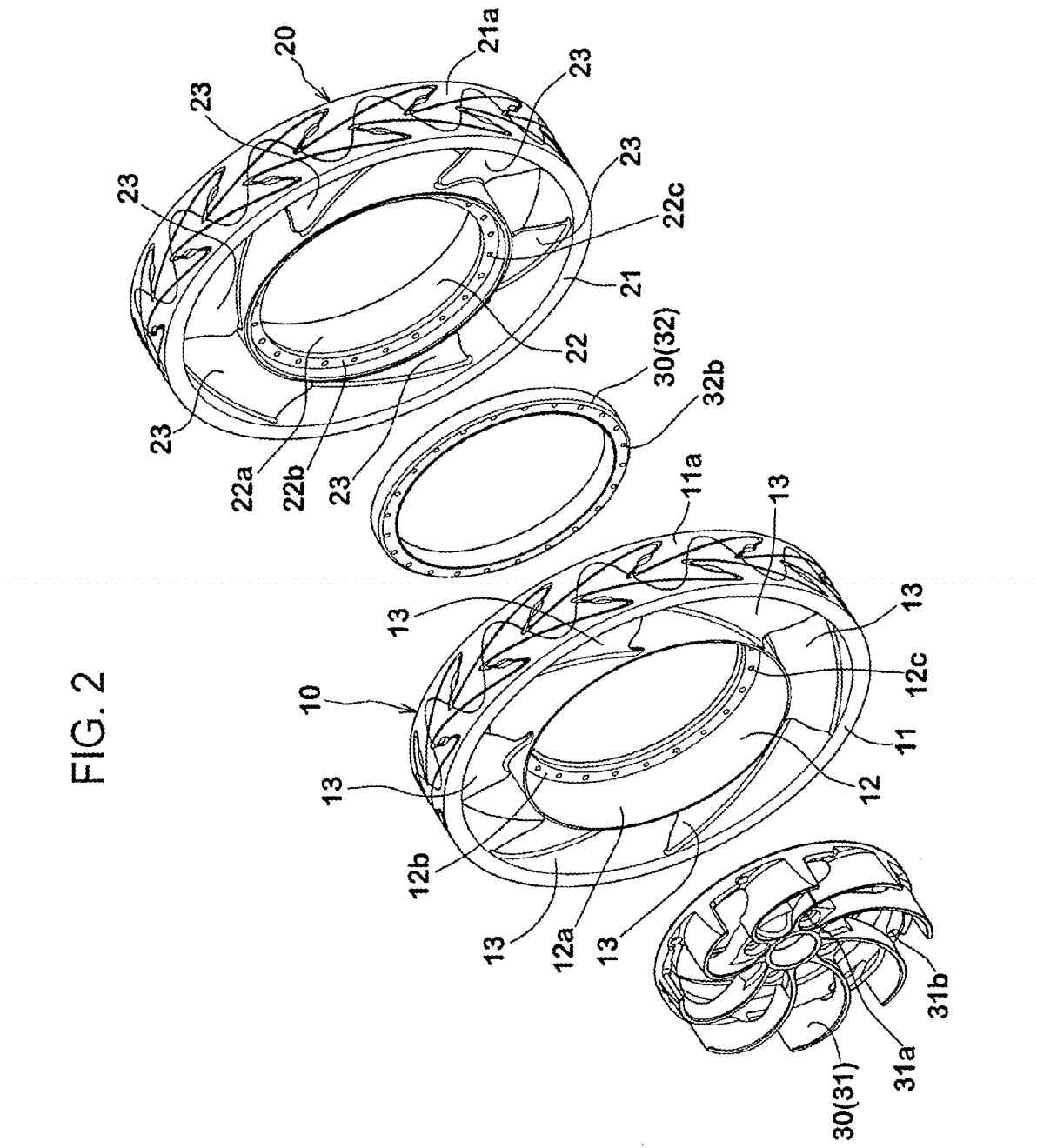
FIG. 2 is an exploded view of the airless tire of FIG. 1.

FIG. 1 is a perspective view of an airless tire 1 according to an embodiment of the present invention. FIG. 2 is an exploded view of the airless tire 1. As illustrated in FIGS. 1 and 2, the airless tire 1 of the present embodiment is divided into a first tire piece 10 and a second tire piece 20.

The first tire piece 10 and the second tire piece 20 have the same outer diameter. A tire axial direction length of the first tire piece 10 and a tire axial direction length of the second tire piece 20 may be different.

The first tire piece 10 and the second tire piece 20 are integrated in a state of being aligned in the tire axial direction, and the airless tire 1 is formed. In the present embodiment, the first tire piece 10 and the second tire piece 20 are respectively positioned on an outer side and an inner side of a vehicle.

As illustrated in FIG. 2, the first tire piece 10 includes a first tread ring 11 that has a ground contact surface (11a), a first inner periphery part 12, and multiple first spokes 13.

The first tread ring 11 is formed in a cylindrical shape. The first tread ring 11 includes a tread rubber that forms the ground contact surface (11a), and a reinforcing cord layer (not illustrated in the drawings) that is provided on a tire radial direction inner side of the tread rubber. Materials similar to belt cords of a pneumatic tire, such as steel cords and organic fiber cords, can be used as appropriate for the reinforcing cord layer. By the reinforcing cord layer, a shape of the first tread ring 11 is maintained and load acting on the airless tire 1 is supported.

The first inner periphery part 12 is positioned on a radial direction inner side of the first tread ring 11. Similar to a conventional tire wheel, the first inner periphery part 12 is formed using a metal material such as steel, an aluminum alloy or a magnesium alloy. A tire axial direction length of the first inner periphery part 12 and a tire axial direction length of the first tread ring 11 are the same.

The first spokes 13 connect the first tread ring 11 to the first inner periphery part 12. The first spokes 13 can be formed, for example, by a cast-molded body using a polymer material. In the present embodiment, the plate-like first spokes 13 that extend while inclining in a circumferential direction of the first tire piece 10 are used.

Similarly, the second tire piece 20 includes a second tread ring 21 that has a ground contact surface (21a), a second inner periphery part 22, and multiple second spokes 23. Structures of the second tread ring 21, the second inner periphery part 22 and the second spokes 23 are the same as those of the first tread ring 11, the first inner periphery part 12 and the first spokes 13.

In an embodiment of the present invention, as illustrated in FIG. 2, the first tire piece 10 and the second tire piece 20 can be separately manufactured and thereafter, the two can be integrated. Therefore, the first spokes 13 on the first tire piece 10 side and the second spokes 23 on the second tire piece 20 side are independent and can be separately molded. As a result, design flexibility of the first spokes 13 and the second spokes 23 can be improved, and uniformity performance and design performance of the airless tire 1 can be easily improved.

The first tire piece 10 and the second tire piece 20 are integrated by fixing the first inner periphery part 12 and the second inner periphery part 22 to each other. As a result, the first spokes 13 and the first tread ring 11 on the first tire piece 10 side and the second spokes 23 and the second tread ring 21 on the second tire piece 20 can deform independently of each other. Therefore, riding comfort performance and the like of the airless tire 1 can be improved.

The first tread ring 11 and the second tread ring 21 are adjacent to each other without leaving a gap therebetween in the tire axial direction. As a result, the first tread ring 11 and the second tread ring 21 support each other during cornering, and a lateral rigidity of the airless tire 1 is improved. It is also possible that the first tread ring 11 and the second tread ring 21 are positioned apart from each other in the tire axial direction. In this case, a groove is formed between the first tread ring 11 and the second tread ring 21, and drainage performance on a wet road surface can be improved.

Figure 3:
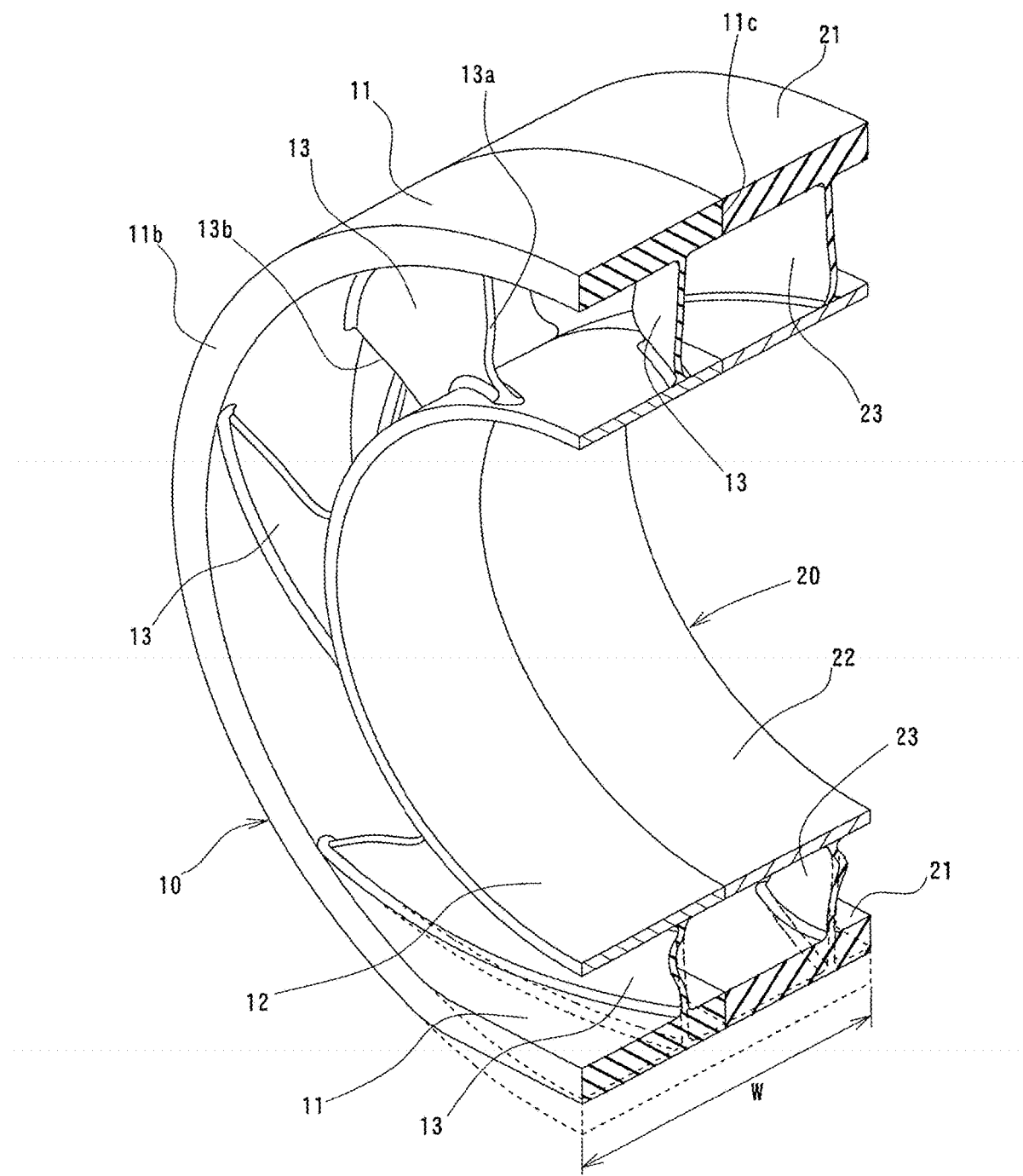
FIG. 3 is a cross-sectional view of the airless tire of FIG. 1.

FIG. 3 illustrates a cross section of the airless tire 1, the cross section containing a tire axis. In FIG. 3, a shape of the airless tire 1 when load is exerted is depicted using a solid line, and a shape of the airless tire 1 when load is not exerted is depicted using a dashed line. FIGS. 4A and 4B are developed views when positions of the first spokes 13 and the second spokes 23 are viewed from the tire axis side. FIG. 4A illustrates shapes of the first spokes 13 and the second spokes 23 of the airless tire 1 when load is not exerted. FIG. 4B illustrates shapes of the first spokes 13 and the second spokes 23 of the airless tire 1 when load is exerted.

As illustrated in FIGS. 3, 4A and 4B, the first spokes 13 and the second spokes 23 are arrayed at positions such that they are not in contact with each other before and after load is exerted to the airless tire 1. Here, for example, the term "load" refers to an upper limit load of an expected range under a condition of use of the airless tire 1.

The first spokes 13 and the second spokes 23 are each formed in a curved shape that is convex toward a tire axial direction outer side. As a result, when load is exerted, the first spokes 13 and the second spokes 23 each bend so as to project to the tire axial direction outer side. As a result, a projecting portion (13c) of a first spoke 13 and a projecting portion (23c) of a second spoke 23 that are adjacent to each other in the tire axial direction move in directions away from each other, and contact between the first spoke 13 and the second spoke 23 can be avoided.

In the present embodiment, the first tire piece 10 is formed such that a tire axial direction maximum width of each of the first spokes 13 does not change before and after a load is exerted to the first inner periphery part 12. Similarly, the second tire piece 20 is formed such that a tire axial direction maximum width of each of the second spokes 23 does not change before and after load is exerted to the second inner periphery part 22. As a result, before and after load is exerted to the airless tire 1, contact between the first spokes 13 and the second spokes 23 can be further avoided.

Due to the exerting of the load, the first tread ring 11 and the second tread ring 21 are slightly enlarged in the tire axial direction, and this affects maximum widths of the first tire piece 10 and the second tire piece 20. However, deformations of the first tread ring 11 and the second tread ring 21 when the load is exerted is very small relative to deformations of the first spokes 13 and the second spokes 23. Therefore, the change in the above-described maximum widths is not considered.

More specifically, in the first tire piece 10, an edge (13a) of each of the first spokes 13 is positioned on an inner side at a distance (D11) away from a tire axial direction edge (11b) of the first tread ring 11. On the other hand, an edge (13b) of each of the first spokes 13 is positioned on an inner side at a distance (D12) away from a tire axial direction edge (11c) of the first tread ring 11.

Similarly, in the second tire piece 20, an edge (23a) of each of the second spokes 23 is positioned on an inner side at a distance (D21) away from a tire axial direction edge (21b) of the second tread ring 21. On the other hand, an edge (23b) of each of the second spokes 23 is positioned on an inner side at a distance (D22) away from a tire axial direction edge (21c) of the second tread ring 21.

The distance (D11) and the distance (D12) can be determined according a tire axial direction projection amount of the first spokes 13 when load is exerted. From such a point of view, the distance (D11) and the distance (D12) are preferably, for example, 5 mm or more. The distance (D21) and the distance (D22) are the same as the distance (D11) and the distance (D12).

It is also possible that the first spokes 13 and the second spokes 23 are formed such that the first spokes 13 and the second spokes 23 project toward the same direction (for example, inward or outward direction of the vehicle) when load is exerted. According to such first spokes 13 and second spokes 23, even when the tire axial direction maximum widths change, contact between the first spokes 13 and the second spokes 23 can be avoided.

FIG. 5A-6B illustrate other embodiments in which contact between the first spokes 13 and the second spokes 23 before and after load is exerted to the airless tire 1 can be avoided.

The first spokes 13 and the second spokes 23 illustrated in FIGS. 5A and 5B extend parallel to the tire axial direction. As illustrated in FIG. 5B, such first spokes 13 and second spokes 23 do project in the tire axial direction when load is exerted. Therefore, the above-described distances (D11, D12, D21, D22) may be 0 mm.

Figure 6A:
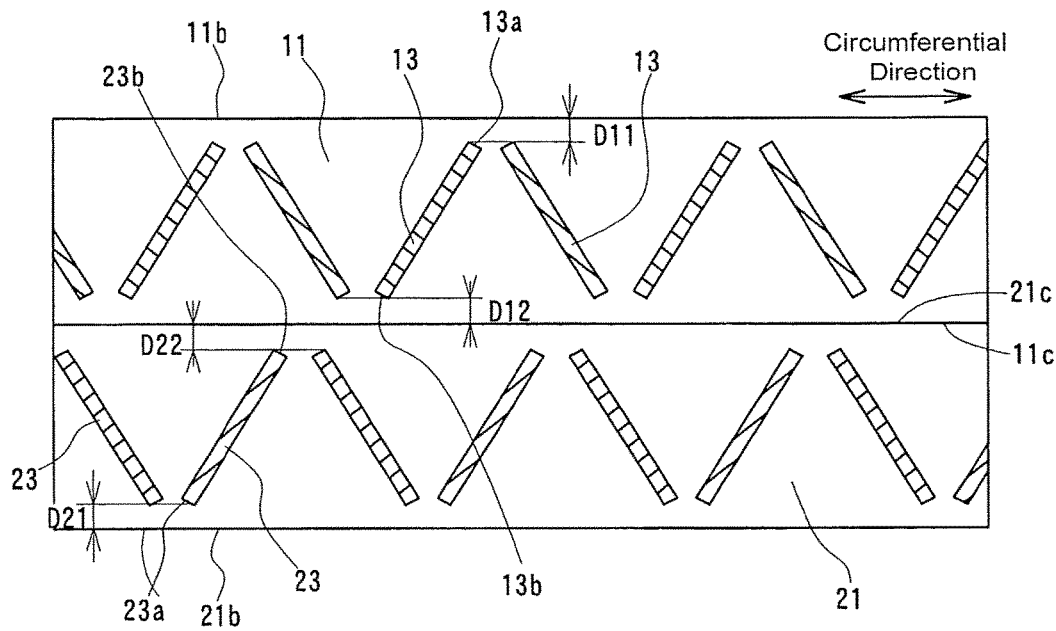
FIGS. 6A and 6B are developed views when first spokes and second spokes of another modified embodiment of FIGS. 4A and 4B are viewed from a tire axis side.
Figure 6B:
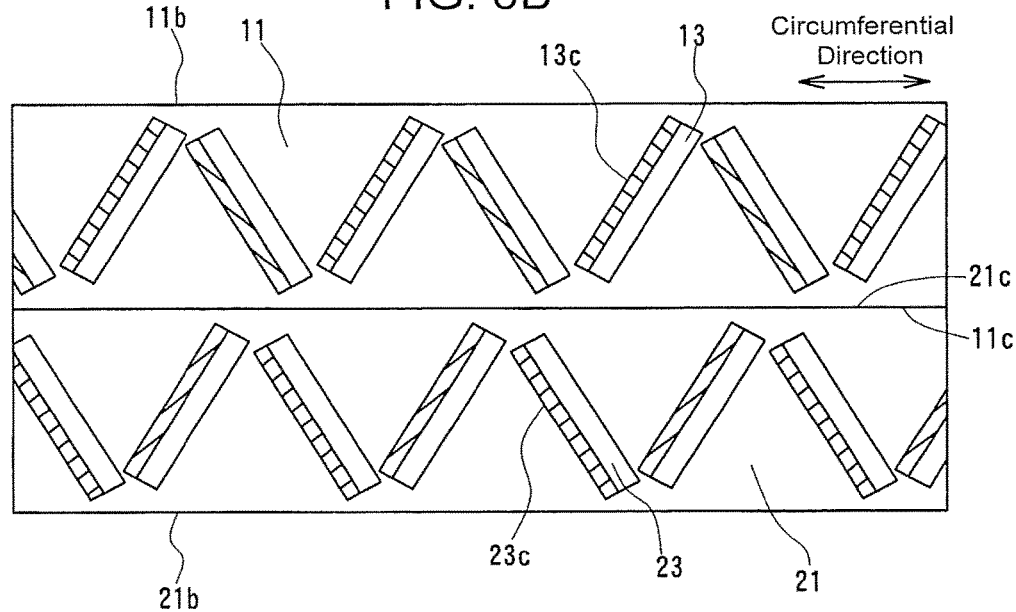

The multiple first spokes 13 illustrated in FIGS. 6A and 6B are provided as spokes that extend and incline in mutually opposite directions. Absolute values of inclination angles of the first spokes 13 and the second spokes 23 with respect to the tire circumferential direction are equal. Such first spokes 13 and second spokes 23 are continuous in the tire circumferential direction and deform in the same shape during rolling. Therefore, uniformity performance of the airless tire 1 is improved. The distances (D11, D12) of the first spokes 13 and the distances (D21, D22) of the second spokes 23 illustrated in FIGS. 6A and 6B are the same as in the case of the first spokes 13 and second spokes 23 illustrated in FIGS. 4A and 4B.

Figure 7:
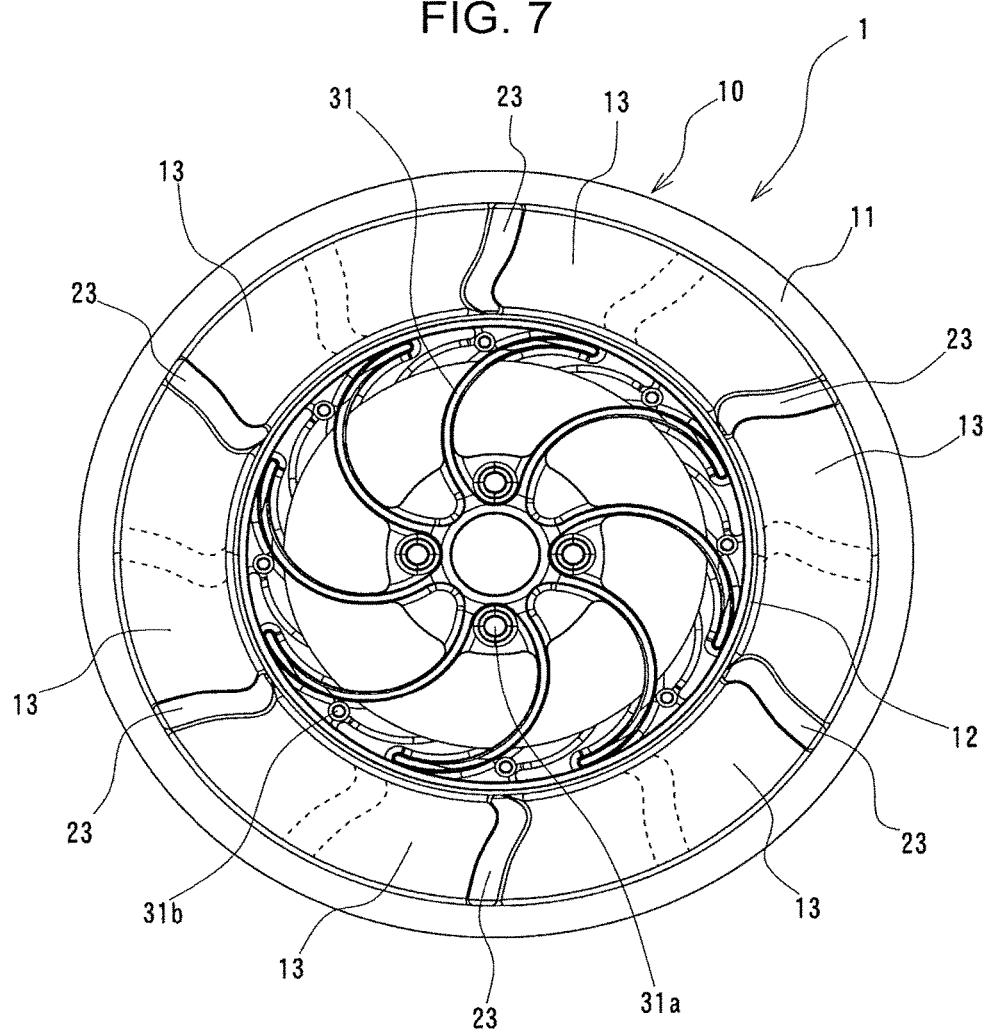
FIG. 7 is a side view of the airless tire of FIG. 1.

FIG. 7 is a side view of the airless tire 1. The first spokes 13 of the first tire piece 10 are periodically arrayed in the tire circumferential direction. On the other hand, the second spokes 23 of the second tire piece are periodically arrayed in the tire circumferential direction. The position of the first spokes 13 is shifted in phase in the tire circumferential direction with respect to the position of the second spokes 23. As a result, in combination with the first spokes 13 and the second spokes 23 that are inclined in the tire circumferential direction, contact between the first spokes 13 and the second spokes 23 can be further avoided.

Further, first spokes 13 and second spokes 23 that are adjacent to each other in the tire circumferential direction are positioned to partially overlap each other in the tire circumferential direction. As a result, during rolling of the airless tire 1, load is continuously seamlessly supported by the first spokes 13 or the second spokes 23. Therefore, vibration of the airless tire 1 is reduced, and uniformity performance and riding comfort performance are improved.

As described above, in the present embodiment, the airless tire 1 is formed by being divided into the first tire piece 10 and the second tire piece 20, which are molded and thereafter integrated. Therefore, the first spokes 13 on the first tire piece 10 side and the second spokes 23 on the second tire piece 20 side can be separately molded. Therefore, the first spokes 13 and the second spokes 23 that partially each other in the tire circumferential direction can be formed easily and at a low cost using a mold of a simple structure.

As illustrated in FIGS. 1 and 2, in the present embodiment, the first tread ring 11 and the second tread ring 21 have the same shape. That is, the first tread ring 11 and the second tread ring 21 have the same outer diameter and tire axial direction length. Further, tread patterns having the same groove shape are formed on the ground contact surface (11*a*) of the first tread ring 11 and the ground contact surface (21*a*) of the second tread ring 21. As a result, design of the airless tire 1 becomes easy, and various performances such as drainage performance and steering stability can be easily improved.

It is desirable that the first tread ring 11 and the second tread ring 21 have symmetrical shapes with respect to a plane that passes through between the first tire piece 10 and the second tire piece 20 and is perpendicular to a tire rotation axis. Such first tread ring 11 and second tread ring 21 are effective in improving the uniformity performance of the airless tire 1.

It is desirable that the first spokes 13 and the second spokes 23 have symmetrical shapes with respect to the plane that passes through between the first tire piece 10 and the second tire piece 20 and is perpendicular to the tire rotation axis. Such first spokes 13 and second spokes 23 are effective in improving the uniformity performance of the airless tire 1.

In the present embodiment, the first tire piece 10 has an asymmetrical shape with respect to its equator plane. As a result, design flexibilities of the first tread ring 11, the first inner periphery part 12 and the first spokes 13 are improved, and various performances of the airless tire 1 are easily improved. The second tire piece 20 also has an asymmetrical shape with respect to its equator plane. As a result, design flexibilities of the second tread ring 21, the second inner periphery part 22 and the second spokes 23 are improved, and various performances of the airless tire 1 are easily improved. It is also possible that at least one of the first tire piece 10 and the second tire piece 20 is formed to have an asymmetrical shape with respect to its equator plane.

As illustrated in FIGS. 1 and 2, the airless tire 1 further has a coupling part 30 for coupling the first inner periphery part 12 or the second inner periphery part 22 to an axle. In the present embodiment, the coupling part 30 has a first coupling part 31 that is mounted on a tire axial direction outer side of the first inner periphery part 12. The first coupling part 31 is formed in a disc-like shape. A through hole (31*a*) allowing a hub bolt to be inserted therethrough is provided in a center portion of the first coupling part 31 for coupling to the axle.

In the present embodiment, the coupling part 30 is detachably attached to the first inner periphery part 12 or the second inner periphery part 22. As a result, by manufacturing multiple kinds of first coupling parts 31 of different designs and allowing the first coupling parts 31 to be changed according to user's preference, airless tires 1 of various designs can be easily provided. Further, by manufacturing multiple kinds of first coupling parts 31 that have different offset amounts and PCDs and allowing the first coupling parts 31 to be changed according to a design of a vehicle, while allowing the first inner periphery part 12 and the second inner periphery part 22 to have a universal design, airless tires 1 compatible with various types of vehicles can be easily provided.

As illustrated in FIG. 2, the first inner periphery part 12 includes a first cylindrical part (12*a*) that is positioned on a tire radial direction inner side of the first spokes 13, and a first flange part (12*b*) that projects on an inner peripheral side of the first cylindrical part (12*a*). The first flange part (12*b*) is formed perpendicular to an axial direction of the first tire piece 10.

On the other hand, the second inner periphery part 22 includes a second cylindrical part (22*a*) that is positioned on a tire radial direction inner side of the second spokes 23, and a second flange part (22*b*) that projects on an inner peripheral side of the second cylindrical part (22*a*). The second flange part (22*b*) is formed perpendicular to an axial direction of the second tire piece 20.

The first flange part (12*b*) and the second flange part (22*b*) are fixed to each other via the coupling part 30. As a result, the first tire piece 10 and the second tire piece 20 are integrated by the first inner periphery part 12 and the second inner periphery part 22.

The coupling part 30 has a second coupling part 32 that is mounted between the first flange part (12*b*) and the second flange part (22*b*). The first coupling part 31, the first flange part (12*b*), the second coupling part 32 and the second flange part (22*b*) are integrated by being fastened by fasteners such as bolts, and the first inner periphery part 12, the second inner periphery part 22 and the coupling part 30 are integrated. As a result, coupling strength and coupling rigidity of the first inner periphery part 12 and the second inner periphery part 22 are enhanced. Through holes (12*c*, 22*c*, 31*b*, 32*b*) allowing bolts to be inserted therethrough are formed in the first flange part (12*b*), the second flange part (22*b*), the first coupling part 31 and the second coupling part 32.

By manufacturing multiple kinds of second coupling parts 32 having different tire axial direction lengths, it is also possible to change a gap between the first tire piece 10 and the second tire piece or to change an overall width of the airless tire 1. Further, it is also possible to have a structure in which the second coupling part 32 is eliminated, and the first flange part (12*b*) and the second flange part (22*b*) are in direct contact with each other and are fixed to each other.

In the above, the airless tire according to an embodiment of the present invention is described in detail. However, without being limited to the above-described specific embodiment, the present invention can also be embodied in various modified forms. In an embodiment of the present invention, as long as at least the first tire piece and the second tire piece are integrated in a state of being aligned in the tire axial direction, the form of the integration is not limited to the above-described embodiment. For example, it is also possible that the first inner periphery part 12 and the second inner periphery part 22 are integrated by being separately coupled to an axle. Further, it is also possible that an airless tire is formed from three or more tire pieces.

Examples

Airless tires that each form the basic structure illustrated in FIGS. 1 and 2 and are compatible in size with a pneumatic tire of 125/80R13 are prototyped based on specifications illustrated in Table 1, and uniformity performance, productivity and design performance of each of the airless tires are verified.

Uniformity Performance

RFV and LFV of each of the airless tires are measured. A component due to spokes is extracted from a value of an order component of the number of the spokes and is evaluated. An evaluation result of "S" indicates a level that it can be determined that there is no vibration, and an evaluation result of "A" indicates a level that it can be determined that there is vibration but there is no complaint from a driver or a passenger. Further, an evaluation result of "B" indicates a level that there is vibration and there is complaint from a driver or a passenger; and an evaluation result of "C" indicates a level that there is vibration and it is difficult for a vehicle to move straight.

Productivity

Complexity of a mold structure that molds the spokes of each of the airless tires is evaluated by a mold designer. The result is expressed as an index number with a result of Example 1 as 100. A larger index number indicates a simpler mold structure and a better productivity.

Design Performance

Design flexibility of each of the airless tires is evaluated by a designer of the airless tires. Weight of the tread ring is measured. The result is expressed as an index number with a result of Example 1 as 100. A larger index number indicates a higher design flexibility and a better design performance.

The spokes of an airless tire, for example, can be molded by injecting an elastic material such as elastomer into cavities of a mold and curing the elastic material by a chemical change or a temperature change.

However, when the spokes of an airless tire are molded using the above-described method, depending on a shape of the spokes, so-called undercut occurs. Therefore, a structure of the mold for releasing the spokes becomes complicated. Therefore, when it is intended to mold the spokes using a simple mold structure, design flexibility of the spokes is limited. For example, when the spokes are each formed in a shape parallel to a tire axial direction, the above-described undercut is suppressed. For spokes having such a shape, design flexibility is limited, and there is a risk that uniformity performance and design performance cannot be improved.

An airless tire according to an embodiment of the present invention allows uniformity performance and design performance to be easily improved.

An airless tire according to an embodiment of the present invention includes at least a first tire piece and a second tire piece. The first tire piece includes: a cylindrical first tread ring that has a ground contact surface; a first inner periphery part that is positioned on a radial direction inner side of the first tread ring; and multiple first spokes for connecting the first tread ring to the first inner periphery part. The second tire piece includes: a cylindrical second tread ring that has a ground contact surface; a second inner periphery part that is positioned on a radial direction inner side of the second tread

TABLE 1

| | Comparative Example 1 | Comparative Example 2 | Comparative Example 3 | Comparative Example 4 | Example 1 | Example 2 | Example 3 |
|---|---|---|---|---|---|---|---|
| Divided into Tire Pieces | No | No | No | No | Yes | Yes | Yes |
| Position of Spokes | Parallel to axial direction No overlap in circumferential direction | Inclined in one direction No overlap in circumferential direction | Alternately inclined in opposite directions No overlap in circumferential direction | Alternately inclined in opposite directions Overlap in circumferential direction | Alternately inclined in opposite directions Overlap in circumferential direction | Alternately inclined in opposite directions Overlap in circumferential direction | Alternately inclined in opposite directions Overlap in circumferential direction |
| Relation of Tire Pieces | — | — | — | — | Symmetrical | Asymmetrical | Symmetrical |
| Coupling Part | No | No | No | No | Yes | Yes | Yes |
| Attachment Structure of Coupling Part | — | — | — | — | Non-detachable | Non-detachable | Detachable |
| Uniformity Performance | C | B | A | S | S | S | S |
| Productivity (Index Number) | 100 | 100 | 100 | 20 | 100 | 90 | 90 |
| Design Performance (Index Number) | 40 | 60 | 80 | 100 | 100 | 110 | 120 |

As is apparent from Table 1, it can be confirmed the airless tires of the examples allow uniformity performance, productivity and design performance to be improved as compared to the comparative examples.

In an airless tire, similar to a pneumatic tire, excellent uniformity performance is demanded. In an airless tire, in addition to uniformity of a single tread ring and eccentricity between a tread ring and an inner periphery part, design of spokes also affects uniformity of the airless tire. Further, as compared to a side wall of a pneumatic tire, the spokes of an airless tire can be subjected to various design treatments.

ring; and multiple second spokes for connecting the second tread ring to the second inner periphery part. The first tire piece and the second tire piece are integrated in a state of being aligned in a tire axial direction.

In an airless tire according to an embodiment of the present invention, it is desirable that the first tire piece and the second tire piece be integrated by fixing the first inner periphery part and the second inner periphery part to each other.

In an airless tire according to an embodiment of the present invention, it is desirable that the first tread ring and the second tread ring be adjacent to each other without leaving a gap therebetween in the tire axial direction.

In an airless tire according to an embodiment of the present invention, it is desirable that the first spokes and the second spokes be arrayed at positions such that the first spokes and the second spokes are not in contact with each other before and after load is exerted to the airless tire.

In an airless tire according to an embodiment of the present invention, it is desirable that a tire axial direction maximum width of each of the tire pieces does not change before and after load is exerted to each of the inner periphery parts.

In an airless tire according to an embodiment of the present invention, it is desirable that the first spokes of the first tire piece be periodically arrayed in a tire circumferential direction, the second spokes of the second tire piece be periodically arrayed in the tire circumferential direction, and the position of the first spokes be shifted in phase in the tire circumferential direction with respect to the position of the second spokes.

In an airless tire according to an embodiment of the present invention, it is desirable that at least with regard to the tread rings and the spokes, the first tire piece and the second tire piece have the same shape.

In an airless tire according to an embodiment of the present invention, it is desirable that at least with regard to the tread rings and the spokes, the first tire piece and the second tire piece have symmetrical shapes with respect to a plane that passes through between the first tire piece and the second tire piece and is perpendicular to a tire rotation axis.

In an airless tire according to an embodiment of the present invention, it is desirable that at least one of the first tire piece and the second tire piece have an asymmetrical shape with respect to its equator plane.

It is desirable that an airless tire according to an embodiment of the present invention further include a coupling part for coupling one of the first inner periphery part and the second inner periphery part to an axle.

In an airless tire according to an embodiment of the present invention, it is desirable that the coupling part be detachably attached to one of the first inner periphery part and the second inner periphery part.

In an airless tire according to an embodiment of the present invention, it is desirable that the first inner periphery part include: a first cylindrical part that is positioned on a tire radial direction inner side of the first spokes; and first flange part that projects on an inner peripheral side of the first cylindrical part and is fixed to the coupling part, and the second inner periphery part include: a second cylindrical part that is positioned on a tire radial direction inner side of the second spokes; and a second flange part that projects on an inner peripheral side of the second cylindrical part and is fixed to the coupling part.

An airless tire according to an embodiment of the present invention is divided into the first tire piece and the second tire piece. The first tire piece and the second tire piece are integrated in a state of being aligned in the tire axial direction, and the airless tire is formed.

The first tire piece includes the first tread ring that has a ground contact surface, the first inner periphery part, and the multiple first spokes. The first inner periphery part is positioned on the radial direction inner side of the first tread ring, and the first spokes connect the first tread ring to the first inner periphery part. Similarly, the second tire piece includes the second tread ring that has a ground contact surface, the second inner periphery part, and the multiple second spokes. The second inner periphery part is positioned on the radial direction inner side of the second tread ring, and the second spokes connect the second tread ring to the second inner periphery part.

In an embodiment of the present invention, in the state before the first tire piece and the second tire piece are integrated, the first tire piece and the second tire piece can be separately manufactured. Therefore, the first spokes on the first tire piece side and the second spokes on the second tire piece side can be separately molded. As a result, design flexibility of the first spokes and the second spokes can be improved, and uniformity performance and design performance of the airless tire can be easily improved.

Obviously, numerous modifications and variations of the present invention are possible in light of the above teachings. It is therefore to be understood that within the scope of the appended claims, the invention may be practiced otherwise than as specifically described herein.

What is claimed is:

1. An airless tire, comprising:
    a plurality of tire pieces comprising a first tire piece and a second tire piece such that the first tire piece and the second tire piece are integrated in alignment in a tire axial direction; and
    a coupling portion configured to couple one of a first inner periphery portion and a second inner periphery portion to an axle,
    wherein the first tire piece comprises a first tread ring, the first inner periphery portion and a plurality of first spokes such that the first tread ring has a cylindrical form and a ground contact surface, the first inner periphery portion is formed on a radial direction inner side of the first tread ring, and the plurality of first spokes is connecting the first tread ring and the first inner periphery portion, the second tire piece comprises a second tread ring, the second inner periphery portion, and a plurality of second spokes such that the second tread ring has a cylindrical form and a ground contact surface, the second inner periphery portion is formed on a radial direction inner side of the second tread ring, and the plurality of second spokes is connecting the second tread ring and the second inner periphery portion, the first inner periphery portion includes a first cylindrical portion formed on a tire radial direction inner side of the plurality of first spokes, and a first flange portion projecting on an inner peripheral side of the first cylindrical portion and configured to be fixed to the coupling portion, and the second inner periphery portion includes a second cylindrical portion formed on a tire radial direction inner side of the plurality of second spokes, and a second flange portion projecting on an inner peripheral side of the second cylindrical portion and configured to be fixed to the coupling portion.

2. The airless tire according to claim 1, wherein the first tire piece and the second tire piece are integrated such that the first inner periphery portion and the second inner periphery portion are configured to be fixed to each other by the coupling portion.

3. The airless tire according to claim 1, wherein the first tire piece and the second tire piece are integrated in alignment in the tire axial direction by the coupling portion such that the first tread ring and the second tread ring are adjacent to each other without leaving a gap between the first tread ring and the second tread ring in the tire axial direction.

4. The airless tire according to claim 1, wherein the first tire piece and the second tire piece are integrated in alignment in the tire axial direction by the coupling portion such that the first spokes and the second spokes are formed at positions not in contact with each other before and after load is exerted on the plurality of tire pieces.

5. The airless tire according to claim 2, wherein the plurality of first spokes and the plurality of second spokes are positioned such that each of the tire pieces has a tire axial direction maximum width which does not change before and after load is exerted on each of the inner periphery portions.

6. The airless tire according to claim 2, wherein the first tire piece and the second tire piece are formed such that the first spokes are periodically positioned in a tire circumferential direction and that the second spokes are periodically positioned in the tire circumferential direction, and the first tire piece and the second tire piece are integrated in alignment in the tire axial direction by the coupling portion such that the first spokes are shifted in phase in the tire circumferential direction with respect to the second spokes.

7. The airless tire according to claim 2, wherein the first tire piece and the second tire piece have the first and second tread rings in a same shape and the first and second spokes in a same shape.

8. The airless tire according to claim 2, wherein the first tire piece and the second tire piece have the first and second tread rings in a symmetrical shape and the first and second spokes in a symmetrical shape with respect to a plane that passes through between the first tire piece and the second tire piece and is perpendicular to a tire rotation axis.

9. The airless tire according to claim 2, wherein at least one of the first tire piece and the second tire piece has an asymmetrical shape with respect to a tire equator plane.

10. The airless tire according to claim 2, wherein the coupling portion comprises a first coupling portion configured to couple one of the first inner periphery portion and the second inner periphery portion to the axle, and a second coupling portion configured to be mounted to the first and second flange portions of the first and second inner periphery portions such that the second coupling portion is mounted between the first and second inner periphery portions.

11. The airless tire according to claim 1, wherein the first tire piece and the second tire piece are integrated in alignment in the tire axial direction by the coupling portion such that the first tread ring and the second tread ring are adjacent to each other without leaving a gap between the first tread ring and the second tread ring in the tire axial direction.

12. The airless tire according to claim 1, wherein the first tire piece and the second tire piece are integrated in alignment in the tire axial direction by the coupling portion such that the first spokes and the second spokes are formed at positions not in contact with each other before and after load is exerted on the plurality of tire pieces.

13. The airless tire according to claim 1, wherein the plurality of first spokes and the plurality of second spokes are positioned such that each of the tire pieces has a tire axial direction maximum width which does not change before and after load is exerted on each of the inner periphery portions.

14. The airless tire according to claim 1, wherein the first tire piece and the second tire piece are formed such that the first spokes are periodically positioned in a tire circumferential direction and that the second spokes are periodically positioned in the tire circumferential direction, and the first tire piece and the second tire piece are integrated in alignment in the tire axial direction by the coupling portion such that the first spokes are shifted in phase in the tire circumferential direction with respect to the second spokes.

15. The airless tire according to claim 1, wherein the first tire piece and the second tire piece have the first and second tread rings in a same shape and the first and second spokes in a same shape.

16. The airless tire according to claim 1, wherein the first tire piece and the second tire piece have the first and second tread rings in a symmetrical shape and the first and second spokes in a symmetrical shape with respect to a plane that passes through between the first tire piece and the second tire piece and is perpendicular to a tire rotation axis.

17. The airless tire according to claim 1, wherein at least one of the first tire piece and the second tire piece has an asymmetrical shape with respect to a tire equator plane.

18. The airless tire according to claim 1, wherein the coupling portion comprises a first coupling portion configured to couple one of the first inner periphery portion and the second inner periphery portion to the axle, and a second coupling portion configured to be mounted to the first and second flange portions of the first and second inner periphery portions such that the second coupling portion is mounted between the first and second inner periphery portions.

19. The airless tire according to claim 18, wherein the coupling portion is detachably attached to one of the first inner periphery portion and the second inner periphery portion.

20. The airless tire according to claim 1, wherein the first inner periphery portion comprises a metal material, and the second inner periphery portion comprises a metal material.

\* \* \* \* \*